United States Patent
Hitzman et al.

[15] 3,642,578

[45] Feb. 15, 1972

[54] MICROBIAL SYNTHESIS FROM ALDEHYDE-CONTAINING HYDROCARBON-DERIVED PRODUCTS

[72] Inventors: Donald O. Hitzman; Henry E. Alquist, both of Bartlesville, Okla.

[73] Assignee: Phillips Petroleum Company

[22] Filed: Aug. 12, 1968

[21] Appl. No.: 751,926

[52] U.S. Cl. ................................195/28, 195/3 H, 195/31 P
[51] Int. Cl. .....................................C12d 13/00, C12d 13/06
[58] Field of Search ..........................................195/28, 49, 29

[56] References Cited

UNITED STATES PATENTS 3,546,071  12/1970  Douros et al. ..........................195/28

*Primary Examiner*—Lionel M. Shapiro
*Assistant Examiner*—Seymour Rand
*Attorney*—Young and Quigg

[57] ABSTRACT

Proteins, amino acids, gums, and other valuable fermentation products are efficiently biosynthesized from hydrocarbon-derived feedstocks containing aldehydes which have been admixed with a nitrogen-containing compound before being passed to a fermentor.

16 Claims, 1 Drawing Figure

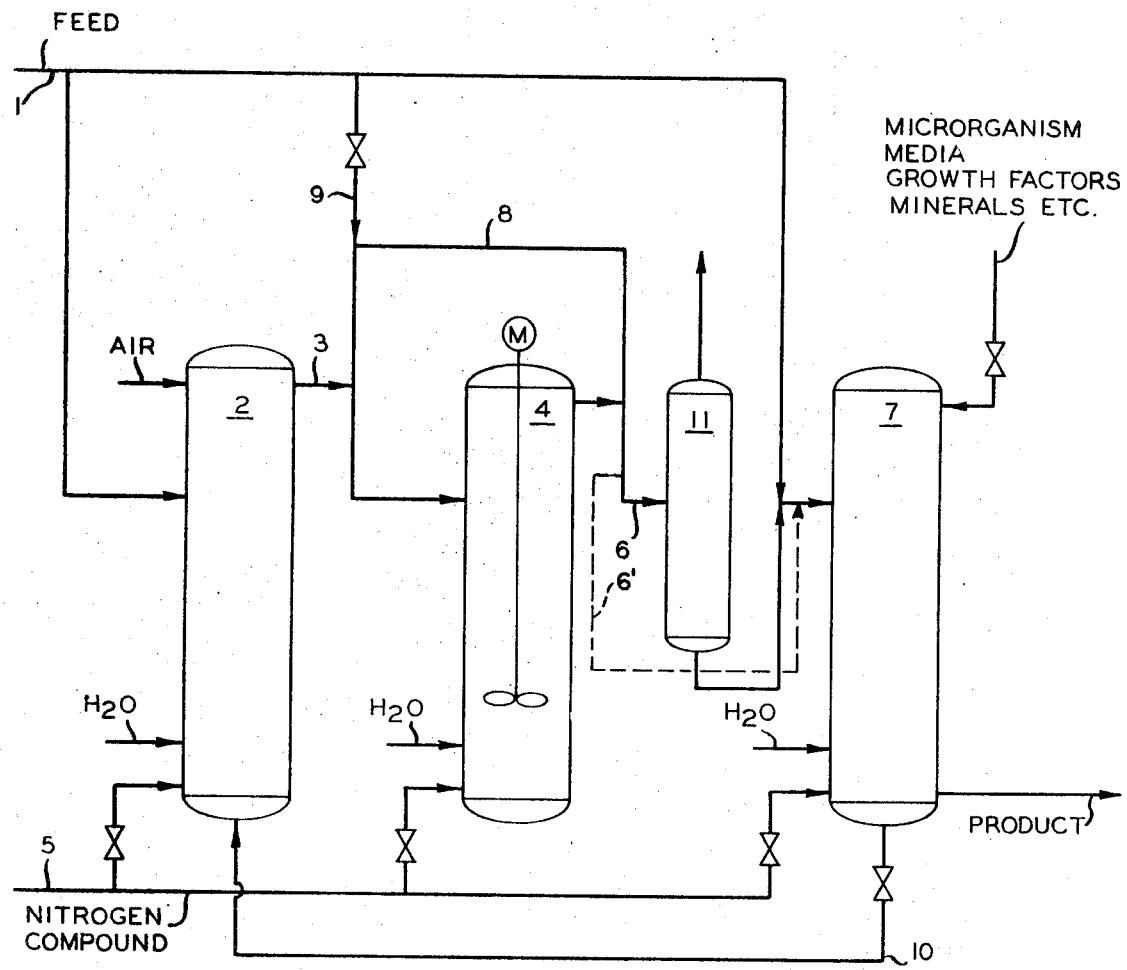

MICROBIAL SYNTHESIS FROM ALDEHYDE-CONTAINING HYDROCARBON-DERIVED PRODUCTS

This invention relates to a process of microbial conversion of hydrocarbon-derived products to proteins, amino acids, gums, and other valuable products. In another embodiment, this invention relates to a method of utilizing oxidized derivatives of methane, such as formaldehyde and methanol, as the feedstock for microbial fermentation. This invention further relates to a unique combination of integrated procedures for microbial synthesis of cellular products.

It is known that micro-organisms have the ability to manufacture edible protein by the fermentation of hydrocarbons.

There is avid interest in this field for hydrocarbons represent one of the greatest sources of raw materials suitable as potential foodstuffs that can be employed to meet a continuing critical world shortage of edible protein.

Large-scale protein synthesis has not developed to the high degree of efficiency wherein high yields of protein are obtained by economical procedures.

The conversion of methane and n-paraffins to edible protein is recognized, but protein so manufactured is known to be frequently contaminated by oil and other deleterious hydrocarbons often resulting in decreased cellular yields and high production cost necessitated by extensive separating, centrifuging, and washing procedures in order to achieve an efficacious product free from aromatic and carcinogenic contamination and hence, suitable as foodstuffs.

Most oxidation products of methane, such as formaldehyde, are considered biocidal in nature and deleterious to the microbial fermentation process. Commercial methanol, an oxidation product of methane, which can be used as a hydrocarbon-derived feedstock often contains deleterious quantities of formaldehyde and consequently inhibits or decreases microbial productivity.

It is known that some micro-organisms are capable of incorporating and oxidizing formaldehyde but heretofore formaldehyde, even at low concentrations, was considered biocidal by those skilled in the art.

In accordance with the instant invention, it has surprisingly been discovered that hydrocarbon-derived products containing substantial amounts of aldehydes, even formaldehyde, whose toxicity to micro-organisms is well documented, can be successfully employed as a nutritional feedstock for microbial fermentation when they have been admixed with a nitrogen-containing compound before being passed to a fermentor.

According to one embodiment of this invention, a procedure has been discovered for utilizing products formed by the oxidation of hydrocarbons. Conversion procedures for obtaining the hydrocarbon-derived product, such as the Fischer-Tropsch synthesis, Topsoe, ICI or other chemical synthesis processes, can be employed to produce the microbial feedstock. High-quality protein can also be economically and abundantly manufactured by the oxidation and fermentation of widely available hydrocarbon sources such as natural gas, petroleum, naphtha, coal, peat, asphalt and the like.

In another embodiment of the invention, hydrocarbons are oxidized and contacted with an aldehyde-reactive nitrogen-containing compound, and the water-soluble mixture formed thereby is fed to a fermentor for microbial fermentation resulting in an uncontaminated microbial production product suitable as a protein food source.

In still another embodiment of this invention, substantial quantities of protein are economically synthesized by an integrated process wherein a hydrocarbon is oxidized, the resultant mixture water washed, the aqueous solution is contacted with ammonia, and the water-soluble mixture is separated and fed directly into a fermentor.

It is an object of this invention to provide protein, amino acids, and other valuable microbial production products to alleviate the continual world shortage of foodstuffs. It is an object of this invention to provide an improved process for the utilization of methane derivatives including methanol as the microbial feedstock. It is an object of this invention to produce gum fermentation products suitable as adhesives, water viscosifiers, oil recovery adjuncts, etc. It is another object of this invention to provide an economical procedure whereby feedstocks containing aldehydes can be effectively fed directly into a fermentor for cellular production. Other objects, advantages, embodiments of this invention will be evident to those skilled in the art from the disclosure and the discussion herein set forth.

The Figure is a diagram of a schematic flowsheet demonstrating implementation of some embodiments of our invention.

Unfortunately, according to the literature, in the direct oxidation of one of the most abundant hydrocarbon sources available, methane, to the oxidized hydrocarbon derivative methanol, formaldehyde is also produced. The concentration of formaldehyde, furthermore, becomes biocidal when conversion rates of methanol that would lend themselves to efficient economic production, are employed. Utilization of pure methanol is often economically prohibitive.

This tremendous obstacle to the feasibility of efficiently and economically manufacturing synthetic high grades of protein has now been eliminated. A process has now been discovered whereby nutrient hydrocarbon derived feedstocks containing deleterious quantities of aldehydes, ketones, carboxylic acids, and the like, can effectively be incorporated in the fermentation process by reacting the aldehyde containing feed with nitrogen-containing compounds before the resultant mixture is fed to a fermentor. In accordance with this method, aldehydes such as formaldehyde or acetaldehyde are not only rendered innocuous but they can be employed as the sole carbon and energy source for microbial production of protein.

A hydrocarbon, such as methane, can now be oxidized to methanol and formaldehyde without using expensive carefully controlled oxidation reaction steps to prevent the formation of deleterious quantities of aldehydes. Time and expense are consequently, jointly conserved. It is to be understood that when the term "hydrocarbon derived" is used, we are referring to compounds that can be produced from hydrocarbon such as by oxidation or that can be obtained by other known methods.

Our process has enhanced desirability because higher maximum efficiency of microbial activity is achieved. The hydrocarbon-derived feedstock that has previously been partially oxidized and rendered essentially free of oil and other undesirable contaminants permits maximum efficiency and conservation of microbial activity.

Examples of those products which can be employed as microbial feedstocks according to this invention include the water-soluble aliphatic alcohols, ketones, aldehydes, carboxylic acids, ethers, and polyols, preferably containing as many as 10 carbon atoms. Some illustrative examples include: methanol, ethanol, propanol, butanol, pentanol, hexanol, 1,7-heptandiol, 2-heptanol, 2-methyl-4-pentanol, pentanoic acid, 2-methylbutanoic acid, 2-pentanol, 2-methyl-4-butanol, 2-methyl-3-butanol, 2-butanol, 2-methyl-1-propanol, 2-methyl-2-propanol, 2-propanol, formic acid, acetic acid, propanoic acid, formaldehyde, acetaldehyde, propanal, butanal, 2-methylpropanal, butanoic acid, 2-methylpropanoic acid, pentanoic acid, glutaric acid, hexanoic acid, 2-methylpentanoic acid, heptandioic acid, heptanoic acid, 4-heptanone, 2-heptanone, octanoic acid, 2-ethylhexanoic acid, glycerine, ethylene glycol, propylene glycol, 2-propanone, 2-butanone, diethyl ether, methyl ethyl ether, dimethyl ether, di-n-propyl ether, n-propyl isopropyl ether, and the like.

Our discovery comprises a process wherein the microbial feed is contacted with nitrogen-containing compounds that are reactive with aldehydes. The aldehydes modified by or in the presence of the nitrogen-containing compound become effective nutrients and the resultant mixture can be fed directly into a fermentor as a carbon and hydrogen nutrient feedstock for cellular production by the micro-organisms under conditions suitable for fermentation. It is preferred that only the water-soluble products of the resultant mixture be fed to the fermentor.

Efficient utilization of almost any hydrocarbon or carbonaceous raw material such as natural gas, petroleum, naphtha, coal, peat, asphalt and the like; and conversion thereof via oxidation and subsequent microbial conversion to microbial production products essentially free of oil and other hydrocarbon contaminants is obtained with an excellent fermentation productivity rate according to this process.

Ethylene can be converted to acetaldehyde and the acetaldehyde and other oxidized water-soluble products resulting from the oxidation process can be used as a feedstock after they have been admixed with ammonia or nitrogen-containing compounds such as urea. Since nitrogen is required for cellular growth, both to neutralize the acids produced and to provide nitrogen for protein synthesis, our method of admixing a nitrogen-containing compound such as ammonia or urea prior to the fermentation effectively accomplishes the foregoing in addition to rendering the feedstock nontoxic if aldehydes are present. Carbon dioxide produced by microbial metabolism in the fermentation process can be incorporated into the whole process by recycling and converting it for use in a Fischer-Tropsch synthesis, or other chemical synthesis processes known to the art, as described in Kirk-Othmer, *Encyclopedia of Chemical Technology*, 2nd Edition, Vol. 13, pp. 382–383, and Vol. 4, pp. 446–480, and consequently promoting increased efficiency.

Other synthetic means of producing the oxygenated hydrocarbon feed source are likewise familiar to those knowledgeable in the art and can be produced such as according to the well-known oxo process where a suitable olefin is hydroformylated with carbon monoxide and hydrogen to form aldehydes and alcohols and the Topsoe and ICI synthesis as described in *Oil and Gas Journal*, Aug. 14, 1967, p. 82, and Feb. 12, 1968, p. 106–109.

The Figure is exemplary of one preferred embodiment of this novel process and represents a schematic flowsheet to aid in the mastery and implementation of this invention. It is not, however, nor are the materials used therein, to be construed or interpreted as a limitation on the scope thereof.

In one embodiment of this invention, a crude or impure hydrocarbon or carbonaceous feed from source 1, can be oxidized in the vessel 2. The oxidized hydrocarbon derivative can be fed via conduit 3 to the vessel 4, where it can be admixed with the nitrogen-containing compound from source 5. The reaction mixture thereof can be directly fed via conduit 6' into the fermentor 7, omitting or bypassing vessel 11, as the microbial feedstock for cellular production. The discretionary employment of vessel 11 will be discussed hereinafter.

In another variation, an aldehyde-containing feed from said source 1 can be fed via conduit 9 to said vessel 4 where it can be admixed with said nitrogen-containing compound from said source 5, and the resulting mixture passed via said conduit 6' directly to said fermentor 7.

Other modifications, such as employing said vessel 2 for the Fischer-Tropsch synthesis of oxygenated hydrocarbon derivatives and feeding the said oxygenated hydrocarbon via said conduit 3 to said vessel 4 where it is admixed with said nitrogen-containing compound from said source 5, and the resulting mixture passed via said conduit 6' directly to said fermentor 7, and the recycling of carbon dioxide from said fermentor 7 via conduit 10 back to said vessel 2 is contemplated.

In still another modification, an oxygenated hydrocarbon from source 1 can be fed to said vessel 2 and the nitrogen-containing compound from said source 5 admixed therewith and the resultant mixture fed via conduit 3 to said vessel 4, water washed therein and the water-soluble products thereof fed via said conduit 6 and through the water separation vessel 11 to said fermentor as a water-soluble oxygenated hydrocarbon feed.

It is believed probable that the conversion of biodeleterious aldehydes, such as formaldehyde, to products such as hexamethylenetetramine and the like is largely responsible for the microbial suitability of these materials as feedstocks.

It is a critical embodiment of our invention that the nitrogen-containing compounds that are reactive with aldehydes be admixed with the oxygenated hydrocarbon feedstock containing aldehydes feedstock before introduction of the resultant mixture to the fermentor.

Illustrative examples of suitable nitrogen-containing compounds which can be employed include ammonia, ammonium hydroxide, ammonium sulfate, ammonium nitrate, ammonium phosphate, acetonitrile, urea, guanidine, uric acid, and the like. Ammonia or ammonium compounds are presently preferred.

Sufficient amounts of the nitrogen-containing compound should be added to render innocuous a substantial amount of the deleterious material in the feedstock. Normally, from about 0.01 to 10 mol equivalents of said nitrogen-containing compound should be provided for each mol of aldehyde.

The fermentation process is carried out according to the conditions generally known in the art to support microbial fermentation. Generally, temperatures in the range of about 15° to about 60° C. and pressures in the range of about 0.1 to 100 atmospheres are employed. Normally pressures in the range of about 1 to 30 atmospheres are used.

One of the most important limitations to increased cell production is the dissolved oxygen level in the fermentor. The dissolved oxygen can be increased by running the fermentor under increased pressures. Pressures of about 0.1 to 50 atmospheres gage are usually employed. For illustration purposes, the methanol urea solution can be fed to a reactor using 8 p.s.i.g. air pressure. The dissolved-oxygen level in the fermentor is consequently increased compared to atmospheric pressure and more cells can be grown in a shorter period of time using identically sized equipment. In addition, higher temperatures can be maintained because at high pressures the micro-organisms can withstand higher temperatures; consequently, cooling expense is reduced. The increased pressure also aids in the recovery of metabolic products by supplying a driving force for filtration or drum drying. By suddenly releasing the pressure of the fermentor, cells can be ruptured, thus releasing cellular components and consequently, a product of enhanced purity can be harvested. The sudden pressure release also volatilizes any volatile impurities present and enhances the overall efficacy of the process.

Sufficient water is present in the fermentation procedure to provide for the particular requirements of the micro-organisms employed. Generally, any micro-organism which is able to utilize oxygenated hydrocarbon feeds can be employed. Suitable hydrocarbon-utilizing bacteria can be cultured and developed as follows.

A soil sample is secured from below the ground surface from any desired plot. Samples of soil taken over a hydrocarbon-bearing formation will generally contain more hydrocarbon-consuming micro-organisms than samples of soil taken over a nonhydrocarbon-bearing area. It is preferred that the soil sample be taken at a sufficient depth below the surface of the ground to avoid surface contamination. Depths ranging from 6 inches to 3 feet are generally preferred, with depths from 2 to 3 feet being more preferred. When securing the samples, care should be taken so that the soil sample be a sample of relatively undisturbed soil at the desired depth. A convenient method of sampling is to dig a hole with the aid of an ordinary post hole digger to approximately the desired depth; then, by use of a hand auger, take a sample of undisturbed soil from the site of the hole at the desired depth.

A 200-g. sample of soil obtained accordingly is blended for approximately 1 minute with 1,000 ml. of a sterile medium having the following composition:

| Mineral Medium No. 1 | |
|---|---|
| $H_2O$ | 1,000 g. |
| $MgSO_4$ | b 0.1 g. |
| $K_2HPO_4$ | 0.5 g. |
| $CaSO_4$ | 0.1 g. |

| NH₄NO₃ | 1.0 g. |

The pH of the soil suspension is then adjusted to 7 with any nondeleterious base while the suspension is agitated. One ml. of the soil suspension is then added to 100 ml. of the said sterile mineral medium to give a 1-to-100-dilution soil suspension. One ml. of the 1-to-100 dilution is then added to 100 ml. of the mineral medium to give a 1-to-10,000-dilution soil suspension. The 1-to-10,000 soil suspension is then mixed with sufficient methanol to yield a 5 volume percent mixture. The cultures are then incubated for 6 days at about 37° C., after which streaks are made on Petri dishes containing agar medium prepared using the following recipe:

| $NH_4NO_3$ | 1.0 g. |
| $MgSO_4$ | 0.1 g. |
| $K_2HPO_4$ | 0.5 g. |
| $CaSO_4$ | 0.1 g. |
| Agar | 15.0 g. |
| Distilled $H_2O$ | 1,000 g. |
| Sufficient methanol to give 1.5 vol. % | methanol. |

The Petri dishes are incubated for 6 days at about 37° C. Viable colonies are restreaked on other Petri dishes as before to purify the colonies.

Single colonies are then transported to mediums comprised according to the recipe for mineral medium No. 1 and containing sufficient methanol to comprise 1.5 volume percent of the total medium.

As will be evident to those skilled in the art various modifications of the mineral growth media can be employed thereby resulting in the propagation of various micro-organisms.

The particular micro-organism employed in this process is not critical and we have cultured and used many that are suitable for employment according to this invention. Exemplary of said micro-organisms are *Pseudomonas methanica*, which has been assigned the numerical designation NRRL B-3449 by the Northern Utilization Research and Development Division, Peoria, Illinois, *Pseudomonas fluorescens*, numerical designation NRRL B-3452, *Methanomonas methanica*, numerical designation NRRL B-3450, *Methanomonas methanooxidans*, numerical designation NRRL B-3451, *Arthobacter parafficum*, numerical designation NRRL B-3453, and *Corynebacterium simplex*, numerical designation NRRL B-3454. The *Pseudomonas* sp. micro-organisms were employed throughout the exemplary runs of our disclosure. *Bacillus, Mycobacterium, Actinomyces,* and *Nocardia* genuses are other illustrative examples of bacteria which have been tested and found to be suitable. Other examples of bacteria include the genuses: *Micrococcus; Rhodobacillus; Chromatium; Nitrosomonas; Serratia; Nitrobacter; Rhizobium; Azotobacter; Aerobacter; Escherichia; Streptococcus; Bactrillum; Clostridium;* and *Corynebacterium*. Other suitable classes of micro-organisms include the yeasts, molds, fungi, and the like. Combinations of micro-organisms can also be employed.

Suitable minerals, growth factors, vitamins, and the like are generally added in amounts sufficient to provide for the particular needs of the micro-organisms utilized.

Mineral and growth factors, and the like, for the micro-organisms which are employed vary according to the particular requirements of the micro-organisms and are generally known to those skilled in the art or are readily determined by those so skilled.

Further addition of nitrogen compounds can be added to the fermentor, such as urea, or ammonia, if desired. The ammonium ions or nitrogen-containing compound charged to the oxidized hydrocarbon feedstocks of our process are normally a sufficient source of nitrogen, however.

Upon completion of the desired degree of fermentation, the microbial fermentation products can be separated by any means known to the art such as centrifugation, filtration, solvent extraction, stripping of volatiles, heating, and the like.

We have discovered that the addition of polar organic solvents such as acetone, ethanol, or methanol, after the fermentation has been completed was surprisingly effectual in precipitating the cells, polymeric gums, and production products from the media. An immediate precipitate was formed following the addition of excess polar organic solvent and the tightly bound cellular mass could be removed by mechanical means leaving a clear solution from which the solvent could be recovered and recycled.

It is a preferred effect of this invention to produce high-quality nutritionally balanced protein materials suitable as foodstuffs. In another embodiment valuable products such as gums, vitamins, amino acids, growth factors, and the like can be produced.

We have discovered that abnormally high quantities of tryptophano, lysine, leusine, threonine, valine, alanine, and glutamic acid which are necessary supplements to deficient food can be synthesized according to example I hereinafter reported by those aforementioned numerically designated micro-organisms using a methanol-formaldehyde-ammonium hydroxide feedstock in the mineral salt media. These micro-organisms grow in a continuous aerobic fermentation process and use this feedstock as both the carbon and nitrogen source and produce the water-soluble amino acids tryptophane, lysine, threonine, valine, alanine, and glutamic acid in the media. According to this embodiment, the microbial cells are recovered and sold as protein and the exhausted culture media is extracted and the amino acids recovered. Identification by paper chromatography establishes that when these aforedesignated micro-organisms are grown on a methanol-formaldehyde-ammonium hydroxide feedstock, essentially these seven said amino acids are produced in abnormally high concentrations and excreted into the media, consequently providing a dual product.

*Pseudomonas methanica* was particularly high in the production of tryptophane, lysine, and threonine; *Pseudomonas fluorescens* in the production of lysine, threonine, leucine, tryptophane and valine; and *Corynebacterium simplex* in the production of leucine, lysine, threonine, tryptophane and alanine.

Exemplary of our disclosure and not to be intended as a limitation on the scope or the materials employed therein, the following examples are given.

EXAMPLE I

A 14-liter New Brunswick stirred fermentor suitably rigged for continuous fermentation and temperature controlled in the range of 32°–40° C., was charged with 7 liters suitable base medium[1] and with 500 cc. of the aforesaid inoculum of *Pseudomonas* sp. *Pseudomonas methanica* NRRL 8-3449 Materials were charged to the reactor and effluent removed until the bacteria had reached an exponential rate of growth and a steady state had been reached. The following data illustrate steady-state fermentor operation (47–70 hours from startup).

| Conditions During Run | Run 1 |
|---|---|
| Base Medium[1] | BH6[1] |
| Air Input | 10 l./min. |
| Stirrer | 1,000 r.p.m. |
| Growth Factors | none |
| Feed Rates | |
| Methanol: Formaldehyde Product[2] | 0.1452 l./hr. |
| $NH_4OH$ (22–26% $NH_3$)[3] | 0.0291 l./hr. |
| Base Medium[1] | 1.200 l./hr. |
| Trace Minerals[4] | 0.016 l./hr. |
| Total Feed Rate | 1.3708 l./hr. |
| Steady-State Fermentor Volume | 3.5 l. |
| Alcohol Content of Effluent | 1.13% |
| Based on These Conditions the Following Calculations Can Be Made: | |
| Retention Time in Fermentor | 2.55 hr. |
| Cell Concentration (dry weight) | 26.1 g./l. |
| Yield of Dried Cells/100 lb. of Methanol Consumed | 36.15 lb. |
| Yield of Dried Cells/100 lb. of[5] Methane Consumed | 72.3 lb. |
| Percent Protein of Cells[6] | 69.4% |
| Fermentor Productivity[7] | 10.23 g./l./hr. |

1. BH6 Base Medium has the following amounts of materials per liter of aqueous solution:
    $KH_2PO_4$      2.5 g.

| | |
|---|---|
| $K_2HPO_4$ | 2.5 g. |
| $(NH_4)_2SO_4$ | 2.0 g. |
| NaCl | 0.1 g. |
| $MgSO_4 \cdot 7H_2O$ | 3.0 g. |
| $CaCl_2$ | 0.04 g. |
| Trace Minerals Soln[4] | 10 ml. |

2. Methanol: Formaldehyde Product is comprised thus:
   14 parts Methanol
   1 part 37% aqueous HCHO
3. $NH_4OH$ was admixed with the Methanol: Formaldehyde Product prior to passing to the fermentor.

4. Trace Mineral solution had the following amounts of the following compounds per liter of solution:

| | |
|---|---|
| $CuSO_4 \cdot 5H_2O$ | 0.06 g. |
| KI | 0.08 g. |
| $FeCl_3 \cdot 6H_2O$ | 4.80 g. |
| $MnSO_4 \cdot H_2O$ | 0.30 g. |
| $Na_2MoO_4 \cdot 2H_2O$ | 0.20 g. |
| $ZnSO_4 \cdot 7H_2O$ | 2.00 g. |
| $H_3BO_3$ | 0.02 g. |

5. Assuming 100% of theoretical conversion of $CH_4$ to $CH_3OH$ if methane is first oxidized to methanol.
6. Percent protein equals percent N×6.25.
7. Fermentor Productivity is in g. of dried cells per liter of ferment per hour retention time in fermentor.

Example I clearly exemplifies the efficient productivity and high-cellular protein content achieved by our process.

EXAMPLE II

A run was effected as in example I except that ammonium hydroxide was charged to the fermentor separately without prior admixing with the methanol:formaldehyde feedstock. The culture was eradicated and fermentation ceased.

Example II demonstrates the criticality of admixing the nitrogen-containing compound of this invention to the oxidized hydrocarbon containing feedstock prior to passing the feedstock to the fermentor.

EXAMPLE III

A 14-liter New Brunswick fermentor, suitably rigged for continuous fermentation and temperature controlled in the range of 32°–40° C., was operated at steady-state conditions employing a bacteria as in example I, but according to the following conditions:

| Conditions During Run | Run 3 | |
|---|---|---|
| Base Medium | BH-5* | |
| Air Input | 8 l./min. | |
| Stirrer | 1,000 r.p.m. | |
| Growth Factors | None | |
| Feed Rates | | |
| Methanol | 15 vol. parts | |
| HCHO (37 wt.% aqueous soln) | 1 vol. part | 0.165 l./hr. |
| $NH_4OH$ (25 wt.% aqueous soln) | 3 vol. parts | |
| Base Medium | | 1.33 l./hr. |
| Trace Minerals | | 0.005 l./hr. |
| Cell Concentration (dry weight) | 23 g./l. | |

(4) See Example I
(8) BH-5 Base Medium is comprised as follows:

| | |
|---|---|
| $KH_2PO_4$ | 2.5 g./l. |
| $K_2HPO_4$ | 2.5 g./l. |
| $(NH_4)_2SO_4$ | 2.0 g./l. |
| NaCl | 0.1 g./l. |
| $MgSO_4 \cdot 7H_2O$ | 3.0 g./l. |
| $CaCl_2$ | 0.02 g./l. |
| Trace Minerals Soln.[4] | 3.75 ml./l. |

The fermentor was monitored by means of: (a) pH of medium; (b) measurement of dissolved $O_2$ in medium; (c) gas chromatography of effluent, e.g., $CH_3OH$ and HCHO concentration; and (d) measurement of cell density of medium.

The input of methanol-formaldehyde-ammonium hydroxide and water mixture and base medium-trace mineral mixture was terminated. Immediately, a feed comprising 14 volume parts $CH_3OH$, 5 volume parts HCHO solution (37 wt. percent aqueous solution), and 3 volume parts of $NH_4OH$ solution (25 wt. percent aqueous solution) was charged to the fermentor on pH demand so as to maintain the pH at 6.5. A total of 50 cc. of this mixture was charged to the fermentor. The monitored functions; e.g., pH=6.5, uptake of $O_2$, absence of $CH_3OH$ or HCHO in effluent, and cell density of 23 g./liter remained constant. This demonstrated that the ferment was utilizing the higher HCHO concentration without difficulty.

When 50 cc. of the above feed had been passed to the fermentor the feed was terminated. Immediately, a feed comprising 14 volume parts of $CH_3OH$, 5 volume parts of HCHO solution (37 wt. percent aqueous solution), and 5 volume parts of $NH_4OH$ solution (25 wt. percent aqueous solution) was charged to the fermentor on pH demand so as to maintain the pH at 6.5. A total of 160 cc. of this mixture was charged to the fermentor: The monitored functions; e.g., pH=6.5, uptake of $O_2$, absence of $CH_3OH$ or HCHO in effluent, and cell density of 23 g./liter remained constant. This demonstrated that the ferment was continuing to utilize the increased HCHO level of the feed wherein a higher level of $NH_4OH$ was employed.

When 160 cc. of the above feed had been passed to the fermentor that feed was terminated. Immediately, a feed comprising 1 volume part of HCHO solution (37 wt. percent aqueous solution) and 1 volume part of $NH_4OH$ solution (25 wt. percent aqueous solution) was charged to the fermentor on pH demand so as to maintain the pH at 6.5. A total of 85 cc. of this mixture was charged to the fermentor. The said monitored functions continued to remain constant.

When 85 cc. of the above feed had been passed to the fermentor that feed was terminated. Immediately, a feed essentially comprising 37 wt. percent HCHO aqueous solution was charged to the fermentor on pH demand so as to maintain the pH at 6.5. Almost immediately, the fermentation terminated as was determined by said monitored functions. The culture was eradicated before 25 cc. of HCHO had passed to the fermentor.

Example III demonstrates the utilization of formaldehydes as a carbon energy source for cellular production by the micro-organisms and further demonstrates the criticality of admixing the nitrogen-containing compound of this invention to the oxidized hydrocarbon containing feedstock prior to passing feedstock to the fermentor.

As before mentioned, we have discovered that in the fermentation process conducted substantially according to example I, that considerable quantities of polymeric gums are produced in the product effluent. The gum can be recovered from the exhausted fermentation media by precipitation with polar organic solvents. It can then be dried to a powder for convenient storage and use.

Variations in the polymeric gum produced can be achieved by employing various of the aforementioned micro-organisms or by variation of the medium composition. Yields of over 50 grams/liter dry weight of gums and cells have been achieved. These polymeric gums can be dissolved in water to form a solution which has a higher viscosity than pure water.

These gums can be used as waterflood additives, as in the recovery of oil, by forming a solution with a desired viscosity equal that of the oil in place so that greater efficiency can be achieved in recovering said oil.

The gum can also be used as a drilling-mud additive and as a water loss control agent. The gum material will increase the viscosity of a drilling mud to which it is added to the desired viscosity and will hold suspended solids. It has no sensitivity to salts and is compatible with other mud additives.

The polymeric gum can also be used as a selective plugging agent and viscosifier for oil formation, i.e., can be used to increase the viscosity of aqueous compositions used in the production of crude oil. The polymeric gum can be solubilized and injected into the formation at a pH below 10. In this pH range, the polymer penetrates to the desired zone or acts as a viscosifier. The pH can be adjusted to at least about 11–11.5 with a suitable basic material. At this pH, the polymeric gums are gelled and form a tough, stringy mass. Basic materials can thus be injected into the formation so that the gum sets up and forms a block. By manipulating the pH, the material can be made very viscous for more oil recovery or formed into a solid to provide a block. In other situations, it may be desirable to inject the caustic first and then follow it with the soluble gum, using a separate zone of water if necessary so premature setting up does not occur except in the zone of maximum water penetration. The material is protected from microbial degradation by the high pH. It is also possible to gel this gum material by adding to the material agents such as acetone, alcohols, and the like.

EXAMPLE IV

Viscosity of the product effluent containing said polymeric gums obtained from a fermentor operated typically as in example 1 using *Pseudomonas fluorescens* NRRL B-3452 was measured in a Brookfield LVT viscosimeter. The viscosities were 14,000 c.p.s., 3,800 c.p.s., 1,200 c.p.s., 384 c.p.s., and 247 c.p.s. at 0.3, 1.5, 6.0, 30, and 60 r.p.m. (with a No. 2 spindle), respectively.

The product effluent was diluted with 3 parts of brine for each 1 part of effluent product, and the viscosity of the diluted mixture was measured in the Brookfield viscosimeter employing the no. 2 spindle. Viscosities of 100 c.p.s., 40 c.p.s., 20 c.p.s., and 18 c.p.s. were observed at 1.5, 6.0, 30.0, and 60.0 r.p.m., respectively.

The foregoing tests effectively demonstrate that the polymeric gums produced according to this invention are useful as viscosifiers for water and water solutions.

EXAMPLE V

The product effluent containing said polymeric gums was diluted as above with 3 parts of Burbank brine, brine prepared to have the salt concentration found in the Burbank Oil Field of Oklahoma, for each part of product. Sand from formation outcrop known to serve as a reservoir for petroleum is packed into a pipe which is 72 inches in length. The sand is saturated with crude oil from the Burbank Field. The sand column is then heated to and maintained at the reservoir temperature of the Burbank Field, while Burbank brine is passed through the sand column until no more oil is eluted. Maintaining the temperature as before, the above 1:3 mixture of product effluent and Burbank brine is then passed through the sand until no more oil is eluted. The total amount of additional oil produced by flooding with the product effluent and brine is equivalent to 7.8 percent of the pore volume of the sand column. Consequently, the foregoing tests demonstrate that flooding with polymeric gum product effluent and Burbank brine mixture resulted in an improved recovery of petroleum.

The polymeric gum has also been found to possess adhesive qualities and to be suitable as a replacement for casein or soy protein adhesives for compounding into paper-coating agents.

EXAMPLE VI

The polymeric gum was employed to bond wood substrate and was discovered to possess an adhesive lap shear strength of 200 p.s.i. based upon ASTM Test No. D-1002-53T; consequently exemplifying the adhesive characteristics of this polymeric gum.

The concepts and products of this invention are applicable for a variety of useful purposes as indicated throughout our specification. Another valuable application of our process is to treat industrial waste and sewage water such as from petroleum and petrochemical operation that often contain aldehydes or other toxic contaminants with ammonia or ammonium hydroxide and subsequently subject the waste water to microbial action so as to render the waste material nontoxic. The ammonia-treating step as taught by our invention permits microbial fermentation of the waste material by forming an amine compound which is easily degraded by the micro-organism as well as providing favorable pH conditions therefor.

It is within the scope of this invention to vary the organism and fermentation environment to achieve maximum optimum yields of any of the many valuable products such as gums, vitamins, amino acids, growth factors, and the like that may be desired. Other modifications of this invention can be accomplished or followed as will be evident to those skilled in the art in light of the foregoing discussion and examples without departing from the spirit and scope thereof.

We claim:
1. A process for microbial synthesis of cellular production products from oxygenated hydrocarbon feedstock containing aldehydes in addition to other oxygenated hydrocarbons which comprises the steps of
    (a) adding to said feedstock nitrogen-containing compounds that are reactive with said aldehydes whereby said aldehydes are rendered innocuous and thereafter
    (b) culturing oxygenated hydrocarbon-utilizing micro-organisms on said nitrogen-treated feedstock from step (a) and thereafter
    (c) harvesting the cellular production products.
2. The process of claim 1 wherein said oxygenated hydrocarbon feedstock comprises minor but biocidal quantities of formaldehyde or acetaldehyde.
3. The process of claim 1 wherein said oxygenated hydrocarbon feedstocks are the products obtained from oxidation of methane.
4. The process of claim 1 wherein said oxygenated hydrocarbon feedstocks are the products obtained from oxidation of ethylene.
5. The process of claim 1 wherein said oxygenated hydrocarbon feedstock is obtained by chemical synthesis.
6. The process of claim 5 wherein carbon dioxide produced by microbial metabolism of said fermentation is recycled and converted for use in said chemical synthesis.
7. The process of claim 1 wherein said nitrogen-containing compound is ammonium hydroxide, and wherein said oxygenated hydrocarbon feedstock comprises methanol and formaldehyde and wherein the fermentation is carried out at temperature from about 15° to about 60° C. and at a pressure from about 0.1 to 100 atmospheres.
8. The process of claim wherein said admixing step (a) comprises adding sufficient nitrogen-containing compounds to render substantially innocuous the deleterious material in said feedstock wherein about 0.01 to 10 mol equivalent of ammonium compound are provided for each mol of aldehyde present in said feedstock.
9. The process of claim 1 wherein said nitrogen-containing compound comprises ammonia, ammonium hydroxide, ammonium sulfate, ammonium nitrate, ammonium phosphate, or like ammonium compounds.
10. The process of claim 1 wherein said nitrogen-containing compound comprises acetonitrile, urea, guanidine, or uric acid.
11. The process of claim wherein said fermentor is operated under increased gage pressures of about 0.1 to 50 atmospheres to promote increased cellular production by the micro-organism, and wherein said micro-organism is *Pseudomonas methanica* NRRL B-3449, *Pseudomonas fluorescens* NRRL B-3452, *Methanomonas methanica* NRRL B-3450, *Methanomonas methanooxidans* NRRL B-3451, *Arthobacter parafficum* NRRL B-3453, or *Corynebacterium simplex* NRRL B-3454.
12. The process of claim 1 wherein essentially only the water-soluble products of step (a) are fed directly into the fermentor.
13. The process of claim 1 wherein the harvesting step (c) comprises recovering the microbial cells and extracting the water-soluble amino acids from the product effluent, and wherein said micro-organism is selected from the group of genuses *Pseudomonas, Methanomonas, Arthobacter, Corynebacterium, Bacillus, Mycobacterium, Actinomyces, Nocardia, Micrococcus, Rhodobacillus, Chromatium, Nitrosomonas, Serratia, Nitrobacter, Rhizobium, Azotobacter, Aerobacter, Escherichia, Streptococcus, Bactrillum,* and *Clostridium.*
14. The process of claim 13 wherein said amino acids are tryptophane, lysine and threonine.

15. The process of claim 1 wherein harvesting step (c) comprises the precipitation of the cells and products with polar organic solvents comprising ethanol, acetone or methanol.

16. The process of claim 1 wherein the harvesting step (c) comprises recovering polymeric gum from the product effluent.

* * * * *

UNITED STATES PATENT OFFICE

CERTIFICATE OF CORRECTION

Patent No. 3,642,578          Donald O. Hitzman et al         February 15, 1972

It is certified that error appears in the above-identified patent and that said Letters Patent are hereby corrected as shown below:

Claim 8, line 1, after "claim" and before "wherein" insert --- 1 ---.

Claim 11, line 1, after "claim" and before "wherein" insert --- 1 ---.

Signed and sealed this 22nd day of August 1972.

(SEAL)
Attest:

EDWARD M. FLETCHER, JR.                  ROBERT GOTTSCHALK
Attesting Officer                            Commissioner of Patents